(12) United States Patent
Lin

(10) Patent No.: US 8,833,045 B2
(45) Date of Patent: Sep. 16, 2014

(54) LAWN MOWER

(76) Inventor: Yu-Lun Lin, Kaohsiung (TW)

( * ) Notice: Subject to any disclaimer, the term of this patent is extended or adjusted under 35 U.S.C. 154(b) by 361 days.

(21) Appl. No.: 13/310,059

(22) Filed: Dec. 2, 2011

(65) Prior Publication Data

US 2012/0137643 A1 Jun. 7, 2012

(30) Foreign Application Priority Data

Dec. 6, 2010 (CN) .......................... 2010 2 0643106

(51) Int. Cl.
A01D 34/78 (2006.01)
A01D 69/02 (2006.01)
H02H 7/08 (2006.01)

(52) U.S. Cl.
CPC . A01D 69/02 (2013.01); H02H 7/08 (2013.01)
USPC ....................................................... 56/11.9

(58) Field of Classification Search
CPC .. A01D 34/006; A01D 34/78; B60C 11/1805; H02H 7/0833; H02H 7/093; H02P 29/02
USPC ..... 56/11.9, 10.2 R, 10.2 G, 10.8, 16.7, 17.5; 318/434, 811; 320/127, 137
See application file for complete search history.

(56) References Cited

U.S. PATENT DOCUMENTS

| 4,626,765 | A | * | 12/1986 | Tanaka | 320/127 |
|---|---|---|---|---|---|
| 4,835,949 | A | * | 6/1989 | Seyerle | 56/10.8 |
| 5,017,854 | A | * | 5/1991 | Gully et al. | 318/811 |
| 5,315,287 | A | * | 5/1994 | Sol | 340/455 |
| 5,367,599 | A | * | 11/1994 | Okada | 388/809 |
| 5,496,658 | A | * | 3/1996 | Hein et al. | 429/93 |
| 5,619,845 | A | * | 4/1997 | Bruener et al. | 320/137 |
| 5,937,622 | A | * | 8/1999 | Carrier et al. | 56/11.9 |

* cited by examiner

Primary Examiner — Robert Pezzuto
(74) Attorney, Agent, or Firm — Schwegman Lundberg & Woessner, P.A.

(57) ABSTRACT

A lawn mower includes an electric motor, a driving assembly coupled to the electric motor, a blade assembly coupled to the driving assembly, a battery for providing electricity to the electric motor, a switch unit electrically connected to the electric motor and the battery, and a detecting unit. The detecting unit includes a sampling resistor electrically connected in series with the battery, and a trigger circuit electrically connected in parallel with the sampling resistor and configured to control the switch unit to make or break electrical connection between the electric motor and the battery according to detected voltage across the sampling resistor.

6 Claims, 5 Drawing Sheets

LAWN MOWER

CROSS-REFERENCE TO RELATED APPLICATION

This application claims priority of Chinese Application No. 201020643106.0, filed on Dec. 6, 2010.

BACKGROUND OF THE INVENTION

1. Field of the Invention

The invention relates to a lawn mower, more particularly to a battery-operated lawn mower.

2. Description of the Related Art

Conventional lawn mowers, based on ways of power acquisition, can be classified into two different types, namely fuel-powered lawn mowers and electric-powered lawnmowers. A fuel-powered lawn mower includes a power generator that uses gasoline or diesel to generate power, which is transmitted to blades of the fuel-powered lawn mower through a turbine. Normally, most of the power is consumed during the power transmission (i.e., wasted), resulting in larger power consumption which may be high as 5000 watts. Other drawbacks include noise, exhaust gas and heat, shorter life span and relatively complicated structure.

An electric-powered lawn mower, on the other hand, does not produce as much noise and exhaust gas as the fuel-powered lawn mower does. Nonetheless, power transmission is still through the turbine mechanism, resulting in equally large power consumption. The large power consumption renders the electric-powered lawn mower insufficient to be powered by a battery. In general, electric-powered lawn mowers receive power from a commercial power source via an electrical wire, which is susceptible to being cut by blades of the lawn mower. A rechargeable battery, particularly a rechargeable battery that can be recharged through solar energy, may be assembled into the lawn mower to provide power. However, the current rechargeable battery is not capable of providing such large power to drive the conventional lawnmower, and a lawnmower with lower power consumption is therefore required. On the other hand, when the blades of the lawn mower are jammed by obstacles, a large electrical current may flow through the lawn mower and can be hazardous to the battery and the motor of the lawn mower.

SUMMARY OF THE INVENTION

Therefore, the object of the present invention is to provide a lawn mower with lower power consumption and configured to protect a battery and a motor thereof.

Accordingly, a lawn mower of the present invention comprises an electric motor, a driving assembly coupled to and driven by the electric motor, a blade assembly coupled to and driven rotatably by the driving assembly, a battery for providing electricity to the electric motor, a switch unit electrically connected to the electric motor and the battery, and a detecting unit.

The driving assembly includes a first belt wheel coupled to the electric motor, a second belt wheel coupled to the blade assembly, and a driving belt trained between the first and second belt wheels. The first belt wheel has a wheel diameter smaller than that of the second belt wheel. The switch unit is operable between an open circuit state, in which electrical connection between the electric motor and the battery is broken, and a closed circuit state, in which electrical connection between the electric motor and the battery is made. The detecting unit includes a sampling resistor electrically connected in series with the battery, and a trigger circuit electrically connected in parallel with the sampling resistor and configured to control the switch unit according to detected voltage across the sampling resistor.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
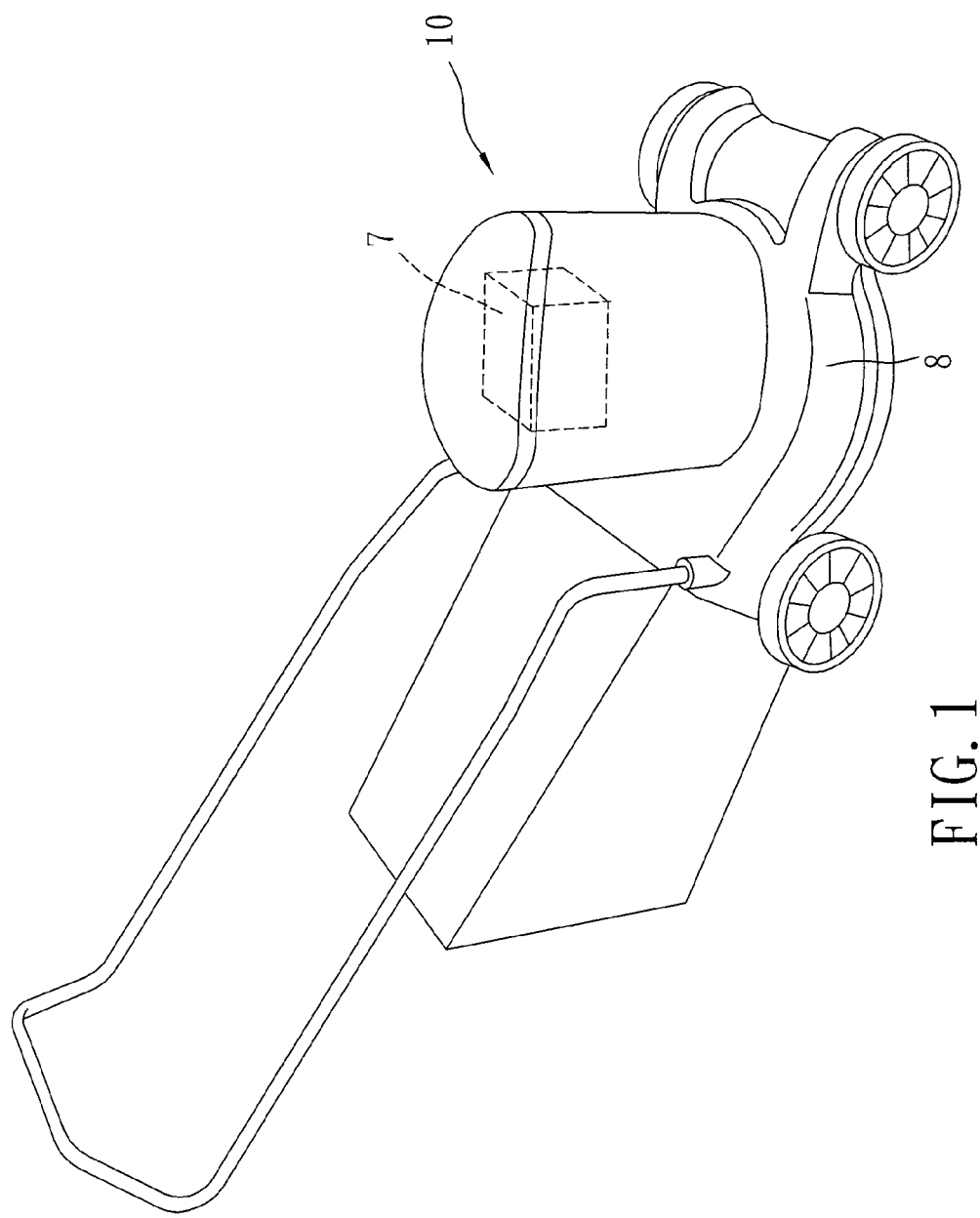
FIG. 1 is a perspective view of a preferred embodiment of a lawn mower according to the invention.
Figure 2:
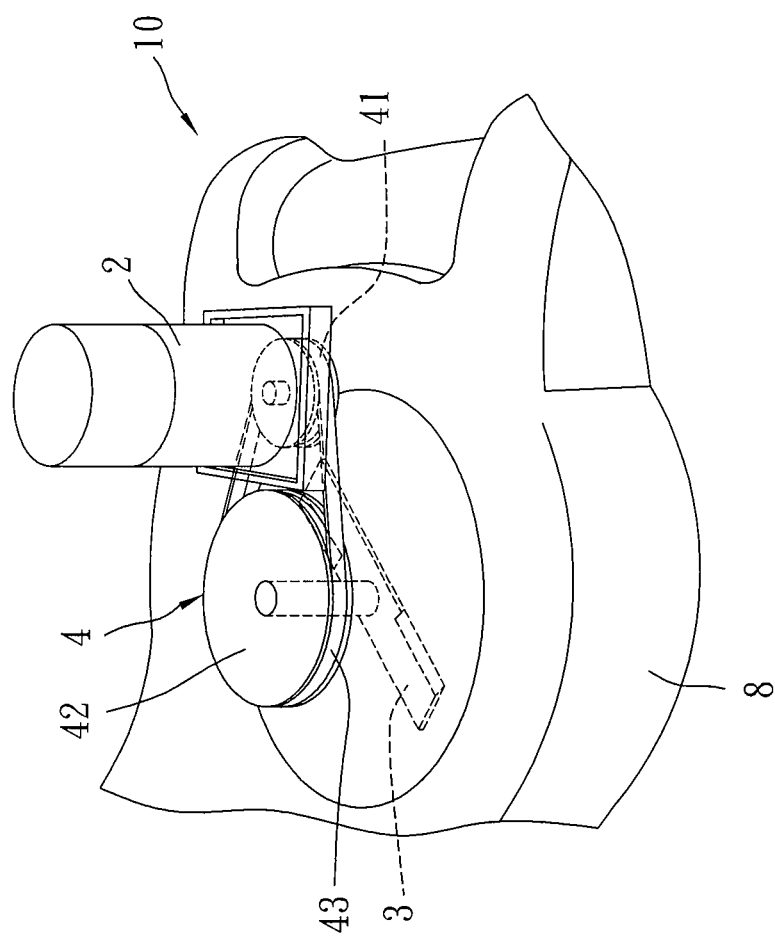
FIG. 2 is a fragmentary perspective view to illustrate a driving assembly, a blade assembly, and an electric motor of the preferred embodiment.
Figure 3:
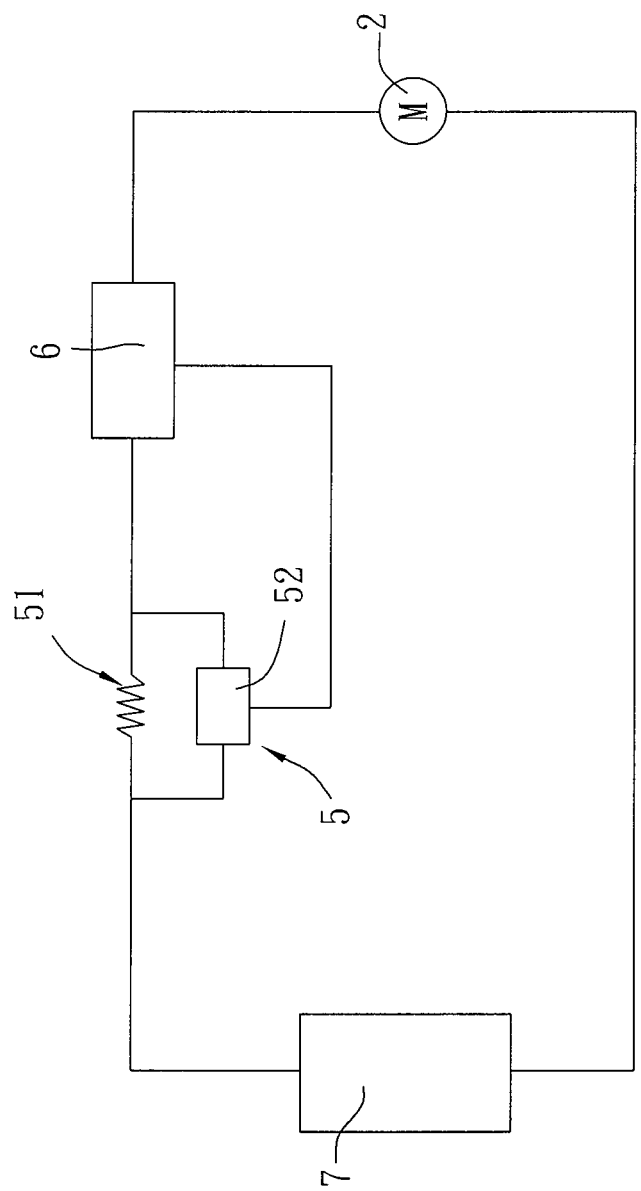
FIG. 3 is a circuit diagram illustrating connections among a battery, a detecting unit, a switch unit and the electric motor.
Figure 4:
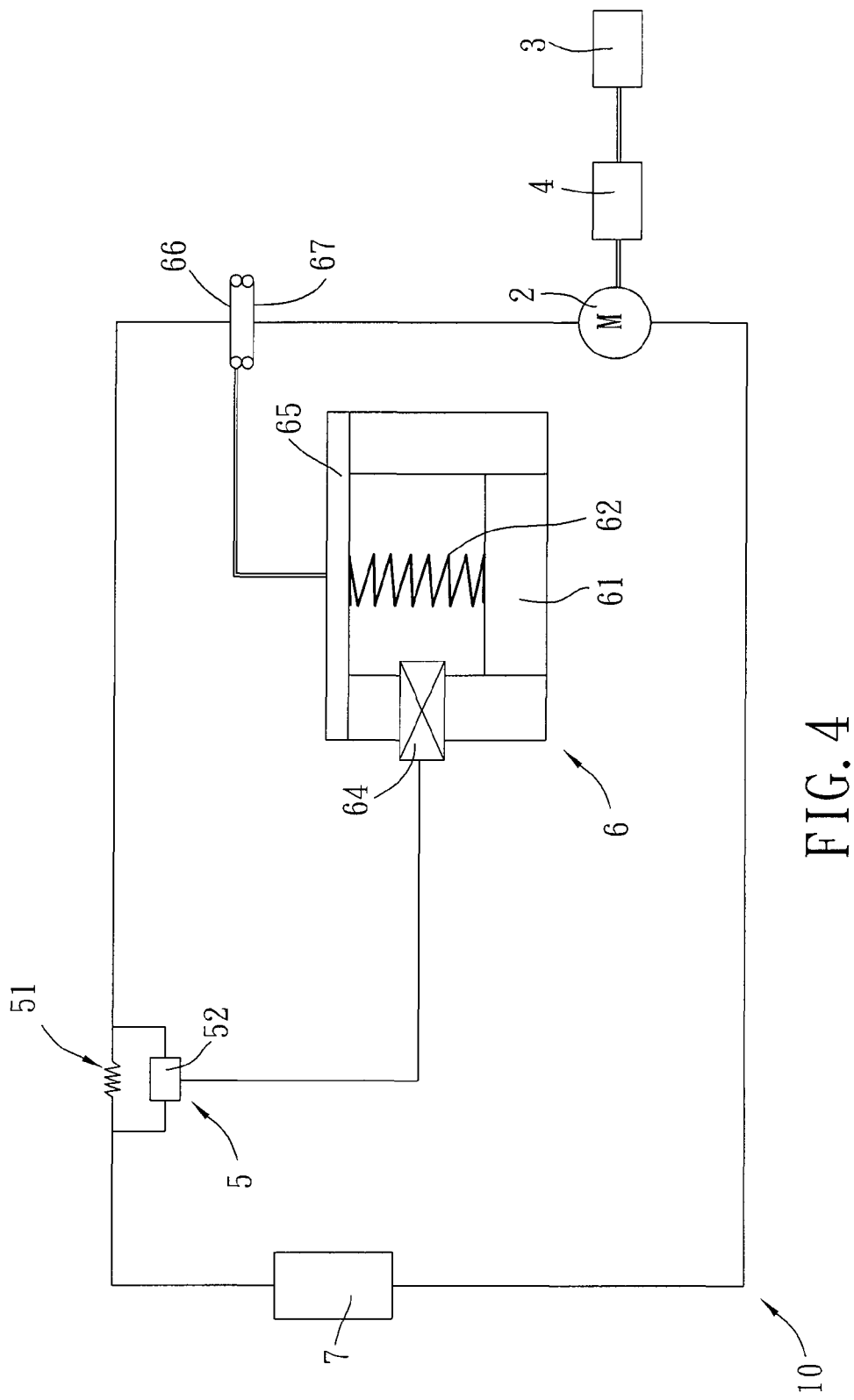
FIG. 4 is a circuit diagram of the preferred embodiment, wherein a movable magnet of the switch unit is at a circuit-making position.

As shown in FIGS. 1 to 4, the preferred embodiment of a lawn mower 10 according to the present invention comprises a mower base 8, a battery 7, an electric motor 2 mounted on the mower base 8, a blade assembly 3, a driving assembly 4, a detecting unit 5 and a switch unit 6.

In this embodiment, the battery 7, which is for providing electricity to the electric motor 2, is rechargeable through a solar energy conversion module (not shown in the Figures) that is configured to convert sunlight to electricity in a conventional manner.

The driving assembly 4 includes a first belt wheel 41 coupled to the electric motor 2, a second belt wheel 42 coupled to the blade assembly 3, and a driving belt 43 trained between the first and second belt wheels 41 and 42.

The first belt wheel 41 is driven rotatably by the electric motor 2. The second belt wheel 42 and the blade assembly 3 are subsequently driven rotatably by the first belt wheel 41 through the driving belt 43. In particular, the first belt wheel 41 has a wheel diameter smaller than that of the second belt wheel 42, such that the electric motor 2 is able to drive the blade assembly 3 with less power consumption. Additionally, the first and second belt wheels 41 and 42 are made of plastic, thereby reducing the overall weight of the lawn mower 10, and load of the electric motor 2.

The detecting unit 5 includes a sampling resistor 51 electrically connected in series with the battery 7, and a trigger circuit 52 electrically connected in parallel with the sampling resistor 51. The trigger circuit 52 is configured to control the switch unit 6 so as to make or break electrical connection between electric motor 2 and the battery 7 according to detected voltage across the sampling resistor 51. In this embodiment, the sampling resistor 51 is selected to have a resistance of 0.1 ohm, and the trigger circuit 52 is an LM358 or LM359 type operation amplifier integrated circuit, having characteristics of a high input impedance and a low operating voltage.

Figure 5:
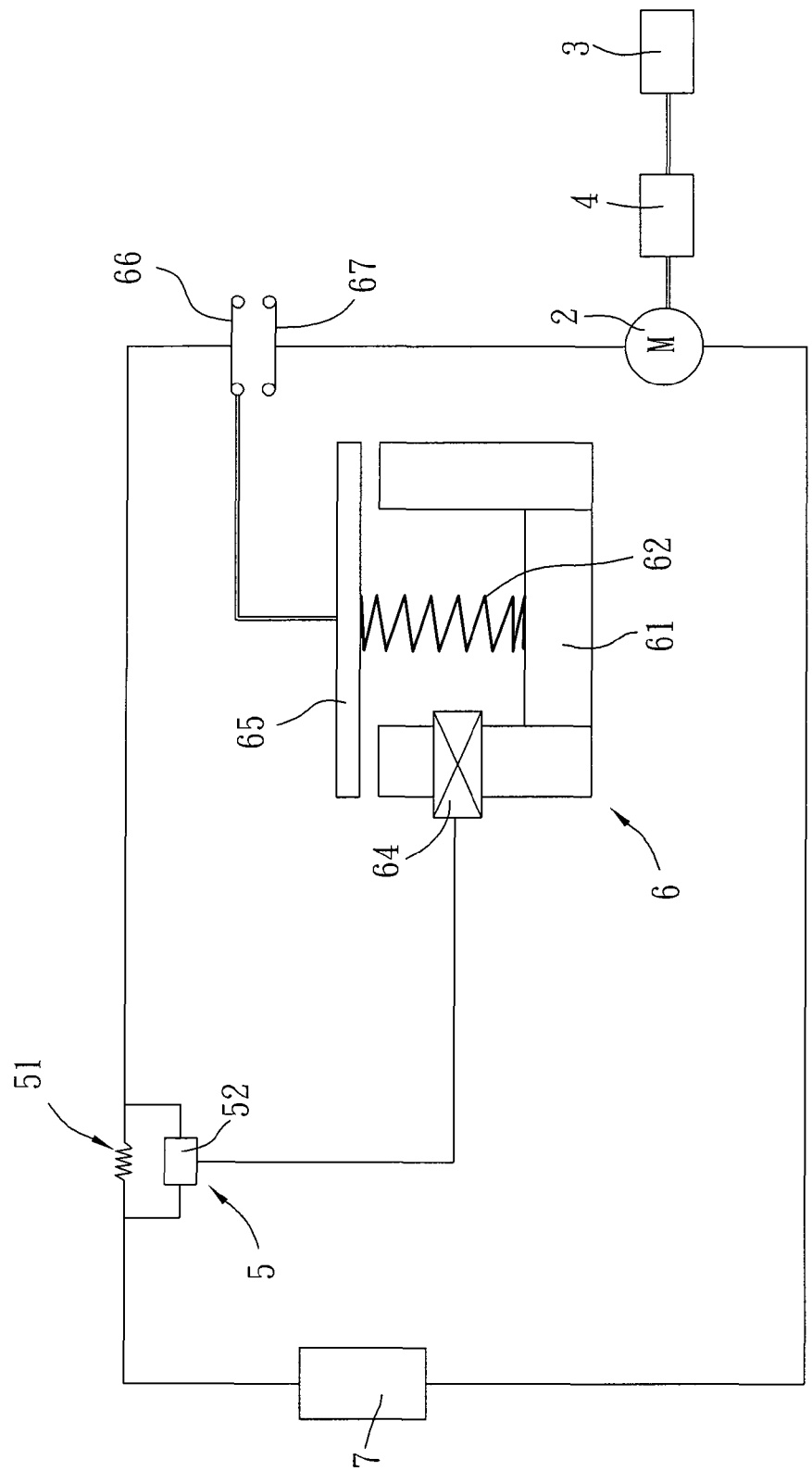
FIG. 5 is a circuit diagram of the preferred embodiment, wherein a movable magnet of the switch unit is at a circuit-breaking position.

Further referring to FIG. 5, the switch unit 6 is electrically connected to the electric motor 2 and the battery 7, and is operable between an open circuit state, in which electrical connection between the electric motor 2 and the battery 7 is broken, and a closed circuit state, in which electrical connection between the electric motor 2 and the battery 7 is made.

The switch unit 6 includes a stationary magnet 61, a movable magnet 65 movable toward and away from the stationary magnet 61, a biasing member 62 disposed between the stationary magnet 61 and the movable magnet 65, a coil 64, an electrically conductive first contact member 66, and an electrically conductive second contact member 67.

The biasing member 62 in this embodiment is a compression spring, and provides a biasing force to bias the movable magnet 65 away from the stationary magnet 61. The movable magnet 65 is movable toward and away from the stationary magnet 61 between a circuit-making position (see FIG. 4) and a circuit-breaking position (see FIG. 5).

The coil 64 is electrically connected to the trigger circuit 52 and is capable of creating a magnetic field to move the movable magnet 65 relative to the stationary magnet 61 upon receipt of electrical current from the trigger circuit 52, such that the movable magnet 65 is moved between the circuit-making position and the circuit-breaking position. The movable magnet 65 is in contact with the stationary magnet 61 when at the circuit-making position, and is spaced apart with the stationary magnet 61 when at the circuit-breaking position.

In this embodiment, the first contact member 66 is electrically connected to the sampling resistor 51, and the second contact member 67 is electrically connected to the electric motor 2. In other embodiments, the first contact member 66 is electrically connected to the electric motor 2, and the second contact member 67 is electrically connected to the sampling resistor 51. In this embodiment, the first contact member 66 is configured to be moved by the movable magnet 65 to make or break electrical contact with the second contact member 67. In other embodiments, the second contact member 67 is configured to be moved by the movable magnet 65 to make or break electrical contact with the first contact member 66.

The trigger circuit 52 provides the electrical current to the coil 64 upon determining that the detected voltage across the sampling resistor 51 is larger than a predetermined threshold, and the coil 64 creates the magnetic field to move the movable magnet 65 away from the stationary magnet 61, and thereby separate the first and second contacting members 66 and 67 from each other.

When the lawn mower 10 is operating, the movable magnet 65 of the switch unit 6 is at the circuit-making position (i.e., the first and second contact members 66 and 67 are in electrical contact), and the battery 7 is electrically connected to the electric motor 2, and provides electricity to drive the blade assembly 3 to rotate. During the operation of the lawn mower 10, the trigger circuit 52 detects the voltage across the sampling resistor 51. When the blade assembly 3 encounters an obstacle and is unable to rotate, or comes into contact with liquid that leads to a short circuit, the electric current flowing through the sampling resistor 51 increases significantly, thereby increasing the voltage across the sampling resistor 51. When the voltage across the sampling resistor 51 reaches a predetermined threshold, the trigger circuit 52 provides the electrical current to the coil 64, which creates the magnetic field to move the movable magnet 65 away from the stationary magnet 61 and to the circuit-breaking position. The first and second contact members 66 and 67 are therefore separated from each other, and the electrical connection between the battery 7 and the electric motor 2 is broken, i.e., the electric motor 2 stops operating. This configuration aims to protect the battery 7, the electric motor 2 and the blade assembly 3.

The movable magnet 65 of the switch unit 6 is attracted to the stationary magnet 61 during operation of the lawn mower 10, and can remain in the circuit-making position without additional power requirement. Additionally, the trigger circuit 52 has characteristics of a high input impedance and a low operating voltage, and is capable of amplifying signals, enabling detection of small voltage changes. That being said, the sampling resistor 51 can be of a very small value (in milliohms in this embodiment) and the power dissipated by having this feature is also low. On the other hand, the first belt wheel 41 of the driving assembly 4 has a wheel diameter smaller than that of the second belt wheel 42 of the driving assembly 4, and the smaller first belt wheel 41 is used to drive the larger second belt wheel 42. This configuration allows use of a low-power electric motor 2 to drive the blade assembly 3, which is an appropriate fit with the rechargeable battery 7 that also provides a relatively low power. Moreover, the driving belt 43 that is trained between the first and second belt wheels 41 and 42 has a relatively low friction during operation, resulting in a better power transmitting efficiency and less noise. Furthermore, the first belt wheel 41 and the driving belt 43 are movable relative to each other when the blade assembly 3 is jammed, thus protecting the electric motor 2 from overly large electrical current.

It should be noted that the first and second belt wheels 41 and 42 are made of plastic, which is lighter in weight and requires less power for driving.

To sum up, the trigger circuit 52 is capable of detecting voltage change across the sampling resistor 52, and controls the switch unit 6 accordingly, allowing the sampling resistor 52 to have a very low resistance. Also, the driving belt 43 that is trained between the first and second belt wheels 41 and 42 has a relatively low friction during operation, so that power transmitting efficiency is improved and less noise is generated. Moreover, the overall configuration has relatively low power consumption, and can be powered by the rechargeable battery 7.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A lawn mower comprising:
    an electric motor;
    a driving assembly coupled to and driven by said electric motor;
    a blade assembly coupled to and driven rotatably by said driving assembly;
    a battery for providing electricity to said motor;
    a switch unit electrically connected to said electric motor and said battery and operable between an open circuit state, in which electrical connection between said electric motor and said battery is broken, and a closed circuit state, in which electrical connection between said electric motor and said battery is made; and
    a detecting unit including a sampling resistor electrically connected in series with said battery, and a trigger circuit electrically connected in parallel with said sampling resistor and configured to control said switch unit according to detected voltage across said sampling resistor;
    wherein said switch unit includes:
        a stationary magnet;

a movable magnet movable toward and away from said stationary magnet;

a biasing member disposed between said stationary magnet and said movable magnet and providing a biasing force to bias said movable magnet away from said stationary magnet;

a coil electrically connected to said trigger circuit and capable of creating a magnetic field to move said movable magnet relative to said stationary magnet upon receipt of electrical current from said trigger circuit;

an electrically conductive first contact member electrically connected to one of said sampling resistor and said electric motor; and an electrically conductive second contact member electrically connected to the other one of said sampling resistor and said electric motor;

wherein one of said first and second contact members is configured to be moved by said movable magnet to make or break electrical contact with the other one of said first and second contact members.

2. The lawn mower as claimed in claim 1, wherein said driving assembly includes:
   a first belt wheel coupled to said electric motor;
   a second belt wheel coupled to said blade assembly; and
   a driving belt trained between said first and second belt wheels;
   wherein said first belt wheel has a wheel diameter smaller than that of said second belt wheel.

3. The lawn mower as claimed in claim 2, wherein said first and second belt wheels are made of plastic.

4. The lawn mower as claimed in claim 1, wherein said battery is rechargeable.

5. The lawn mower as claimed in claim 1, wherein said trigger circuit provides the electrical current to said coil upon determining that the detected voltage across said sampling resistor is larger than a predetermined threshold, and said coil creates the magnetic field to move said movable magnet away from said stationary magnet and thereby separate said first and second contacting members from each other.

6. The lawn mower as claimed in claim 1, wherein said trigger circuit is an amplifier circuit.

* * * * *